US006499033B1

United States Patent
Vagnozzi

(10) Patent No.: US 6,499,033 B1
(45) Date of Patent: *Dec. 24, 2002

(54) DATABASE METHOD AND APPARATUS USING HIERARCHICAL BIT VECTOR INDEX STRUCTURE

(75) Inventor: Paul P. Vagnozzi, Farmington Hills, MI (US)

(73) Assignee: ISC, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,776

(22) Filed: May 25, 2000

Related U.S. Application Data

(63) Continuation of application No. 09/075,241, filed on May 9, 1998, now Pat. No. 6,070,164.

(51) Int. Cl.[7] .................................................. G06F 7/00
(52) U.S. Cl. .............................. 707/101; 707/1; 707/2; 707/6; 707/103; 707/104.1
(58) Field of Search .................. 707/1–10, 100–104.1, 707/200–206; 711/1–10, 100–175, 200–222

(56) References Cited

U.S. PATENT DOCUMENTS

| | | | | |
|---|---|---|---|---|
| 4,606,002 A | | 8/1986 | Waisman et al. ............... 707/3 |
| 4,774,657 A | | 9/1988 | Anderson et al. ............... 707/2 |
| 4,945,475 A | | 7/1990 | Bruffey et al. .................. 707/1 |
| 5,283,894 A | | 2/1994 | Deran ............................ 707/1 |
| 5,293,616 A | | 3/1994 | Flint .............................. 707/3 |
| 5,319,779 A | | 6/1994 | Chang et al. ................... 707/3 |
| 5,418,947 A | * | 5/1995 | Hsy et al. ....................... 707/1 |
| 5,465,359 A | | 11/1995 | Allen et al. ................. 709/101 |
| 5,493,668 A | | 2/1996 | Elko et al. ................... 711/130 |
| 5,537,574 A | | 7/1996 | Elko et al. ................... 711/141 |
| 5,544,345 A | | 8/1996 | Carpenter et al. .......... 711/150 |
| 5,557,786 A | | 9/1996 | Johnson ...................... 707/101 |
| 5,634,072 A | | 5/1997 | Allen et al. .................. 709/104 |
| 5,649,181 A | * | 7/1997 | French et al. ................... 707/3 |
| 5,671,406 A | * | 9/1997 | Lubbers et al. ................. 707/7 |
| 5,752,243 A | | 5/1998 | Reiter et al. .................... 703/3 |
| 5,799,184 A | * | 8/1998 | Fulton et al. ................... 707/2 |
| 5,815,669 A | | 9/1998 | Lee et al. .................... 709/238 |
| 5,870,747 A | * | 2/1999 | Sundaresan ................. 707/101 |
| 5,930,805 A | * | 7/1999 | Marquis ...................... 707/201 |
| 6,141,655 A | * | 10/2000 | Johnson et al. ................. 707/2 |

FOREIGN PATENT DOCUMENTS

EP          06-27726       * 12/1994

\* cited by examiner

Primary Examiner—Srirama Channavajjala
(74) Attorney, Agent, or Firm—Reising, Ethington, Barnes, Kisselle, Learman & McCulloch, P.C.

(57) ABSTRACT

A database having fixed length records stored together in record number order and an index structure for the database. The index structure comprises a separate index for each searchable field of the records. For purposes of indexing, the records are logically divided into fine slices of 8,000 records each, and the fine slices are grouped into coarse slices of 4,000 fine slices each. The indexes include fine and coarse keys, each of which corresponds to a particular data value and a particular fine or coarse slice. Associated with each key is a link that is used to determine which records contain the data value. For the fine keys, the link includes a pointer to a bit vector that has a single bit for each of the records within the fine slice associated with the key. For the coarse keys, the link includes a pointer to a bit vector that has a single bit for each of the fine slices contained in the coarse slice. The coarse bit vector comprises two bit vectors, one that identifies which of the fine slices within the coarse slice contains any records having the data value and one that identifies which fine slices, if any, contain the data value in every one of its records. The keys are stored in a B-tree in order of a unique key value so that they are processed in record number order and the resulting list of records for any query is generated in record number order.

22 Claims, 11 Drawing Sheets

Automobile Database Structure

Logical Separation of Records
Into Coarse and Fine Slices

FIG. 4
Sample Vehicle Color Data

| Record No. | Absolute Coarse Slice No. | Absolute Fine Slice No. | Relative Fine Slice No. | Relative Record No. | COLOR | Other user data fields |
|---|---|---|---|---|---|---|
| 0 | 0 | 0 | 0 | 0 | Black | ... |
| 1 | 0 | 0 | 0 | 1 | Blue | ... |
| 2 | 0 | 0 | 0 | 2 | Gold | ... |
| 3 | 0 | 0 | 0 | 3 | Blue | ... |
| 4 | 0 | 0 | 0 | 4 | Yellow | ... |
| 5 | 0 | 0 | 0 | 5 | Green | ... |
| 6 | 0 | 0 | 0 | 6 | Red | ... |
| 7 | 0 | 0 | 0 | 7 | Green | ... |
| 8 | 0 | 0 | 0 | 8 | Red | ... |
| 8000 | 0 | 1 | 1 | 0 | Blue | ... |
| 8001 | 0 | 1 | 1 | 1 | Red | ... |
| 8002 | 0 | 1 | 1 | 2 | Blue | ... |
| 16000 | 0 | 2 | 2 | 0 | Red | ... |
| 16001 | 0 | 2 | 2 | 1 | Blue | ... |
| 16002 | 0 | 2 | 2 | 2 | Blue | ... |
| 24000 | 0 | 3 | 3 | 0 | Red | ... |
| 64000 | 0 | 8 | 8 | 0 | Orange | ... |
| 160000 | 0 | 20 | 20 | 0 | Orange | ... |
| 448123 | 0 | 56 | 56 | 123 | Violet | ... |
| 24000000 | 0 | 3000 | 3000 | 0 | Orange | ... |
| 32000000 | 1 | 4000 | 0 | 0 | Gold | ... |
| 32000001 | 1 | 4000 | 0 | 1 | Brown | ... |
| 32008099 | 1 | 4001 | 1 | 99 | Blue | ... |
| 32008100 | 1 | 4001 | 1 | 100 | Green | ... |
| 32008101 | 1 | 4001 | 1 | 101 | Blue | ... |
| 32032000 | 1 | 4004 | 4 | 0 | Red | ... |
| 32128000 | 1 | 4016 | 16 | 0 | White | ... |
| 32128001 | 1 | 4016 | 16 | 1 | White | ... |
| 32184000 | 1 | 4023 | 23 | 0 | Silver | ... |
| 60800000 | 1 | 7600 | 3600 | 0 | White | ... |
| 160000000 | 5 | 20000 | 0 | 0 | Yellow | ... |

Index Structure

FIG. 6
Index for Field "Color"

| KEY | | | LINK | | BIT VECTOR |
|---|---|---|---|---|---|
| Type | Slice | Data | Type | Pointer / Relative # | |
| Coarse | 0 | Black | Single Slice | ALL=0; RFSN=0 | |
| Coarse | 0 | Blue | Bit Vector | Pointer | → Bits={0,1,2} |
| Coarse | 0 | Gold | Single Slice | ALL=0; RFSN=0 | |
| Coarse | 0 | Green | Single Slice | ALL=0; RFSN=0 | |
| Coarse | 0 | Orange | Bit Vector | Pointer | → Bits={8,20,3000} |
| Coarse | 0 | Red | Bit Vector | Pointer | → Bits={0,1,2,3} |
| Coarse | 0 | Violet | Single Slice | ALL=0; RFSN=56 | |
| Coarse | 0 | Yellow | Single Slice | ALL=0; RFSN=0 | |
| Coarse | 1 | Blue | Single Slice | ALL=0; RFSN=1 | |
| Coarse | 1 | Brown | Single Slice | ALL=0; RFSN=0 | |
| Coarse | 1 | Gold | Single Slice | ALL=0; RFSN=0 | |
| Coarse | 1 | Green | Single Slice | ALL=0; RFSN=1 | |
| Coarse | 1 | Red | Single Slice | ALL=0; RFSN=4 | |
| Coarse | 1 | Silver | Single Slice | ALL=0; RFSN=23 | |
| Coarse | 1 | White | Bit Vector | Pointer | → Bits={16,3600} |
| Coarse | 5 | Yellow | Single Slice | ALL=0; RFSN=0 | |
| Fine | 0 | Black | Single Record | RRN=0 | |
| Fine | 0 | Blue | Bit Vector | Pointer | → Bits={1,3} |
| Fine | 0 | Gold | Single Record | RRN=2 | |
| Fine | 0 | Green | Bit Vector | Pointer | → Bits={5,7} |
| Fine | 0 | Red | Bit Vector | Pointer | → Bits={6,8} |
| Fine | 0 | Yellow | Single Record | RRN=4 | |
| Fine | 1 | Blue | Bit Vector | Pointer | → Bits={0,2} |
| Fine | 1 | Red | Single Record | RRN=1 | |
| Fine | 2 | Blue | Bit Vector | Pointer | → Bits={1,2} |
| Fine | 2 | Red | Single Record | RRN=0 | |
| Fine | 3 | Red | Single Record | RRN=0 | |
| Fine | 8 | Orange | Single Record | RRN=0 | |
| Fine | 20 | Orange | Single Record | RRN=0 | |
| Fine | 56 | Violet | Single Record | RRN=123 | |
| Fine | 3000 | Orange | Single Record | RRN=0 | |
| Fine | 4000 | Brown | Single Record | RRN=1 | |
| Fine | 4000 | Gold | Single Record | RRN=0 | |
| Fine | 4001 | Blue | Bit Vector | Pointer | → Bits={99,101} |
| Fine | 4001 | Green | Single Record | RRN=100 | |
| Fine | 4004 | Red | Single Record | RRN=0 | |
| Fine | 4016 | White | Bit Vector | Pointer | → Bits={0,1} |
| Fine | 4023 | Silver | Single Record | RRN=0 | |
| Fine | 7600 | White | Single Record | RRN=0 | |
| Fine | 20000 | Yellow | Single Record | RRN=0 | |

RFSN = Relative Fine Slice Number    RRN = Relative Record Number

Key Layout

Fine Link Layout

Coarse Link Layout

Coarse Bit Vector Layout

Structure of Index for Field "Color"

RFSN = Relative Fine Slice Number
RRN = Relative Record Number

Count Process for Retrieval of
Records based Upon a User Query

Retrieval of Records based Upon a User Query

DATABASE METHOD AND APPARATUS USING HIERARCHICAL BIT VECTOR INDEX STRUCTURE

CROSS REFERENCE TO RELATED APPLICATIONS

This application is a continuation of U.S. patent application Ser. No. 09/075,241 filed May 9, 1998, U.S. Pat. No. 6,070,164 issued May 30, 2000.

TECHNICAL FIELD

This invention relates in general to techniques for storing and retrieving data on digital computers, and in particular, to an improved method and apparatus for fast storage and retrieval of data from very large databases using multiple retrieval keys and complex retrieval criteria.

BACKGROUND OF THE INVENTION

As the processing speed and storage capacity of digital computers continues to increase, so does their suitability for management of very large databases. To be useful, a database typically needs to be searchable so that a user can perform keyword searching of the database and retrieve information associated with the keywords. For large databases, linear searching of the data for keywords is typically too time consuming to be useful. Consequently, large databases are often indexed to provide fast query processing and retrieval of data.

As is known, in most databases, data is organized logically and often physically into individual fields within a record, with each record representing a collection of data about an object such as a patient, a vehicle, or a document, and each field within the record containing a different item of data about the object, such as the patient's last name, first name, age, gender, etc. To provide flexibility, the database management program must not only permit single keyword searches of the data fields, but must support more complex queries, including boolean expressions (e.g., AND, OR, NOT) of keywords.

Often, a database will include both high and low cardinality data; that is, the database will include types of data that can have many different values as well as types of data that will have very few different values. Examples of low cardinality data include a person's gender (male or female), political party affiliation, or the make of a vehicle. Examples of high cardinality data include such things as last names, birth dates, vehicle identification numbers (VIN), and social security numbers (SSN), the last two of which will likely include a unique value in every record in the database. For optimum flexibility, a database index must permit efficient searching for both high and low cardinality data. However, typical storage methods are designed and optimized for retrieval of high cardinality data only, using single or compound key indexes.

One way of indexing a database is through the use of keys that provide a fast way to locate specific items of data within the database. These keys are used by a database management program to locate and retrieve records from the database that contain the data associated with the keys. Bitmaps or bit vectors are sometimes used along with keys to identify which records contain a particular item of data within a particular data field. These bit vectors comprise a string of bits with each bit representing a single record in the database. A particular bit vector will represent a particular item of data that is found in a particular field in at least one of the records of the database. The presence of a set bit (i.e., a bit set to a logical one) in the bit vector indicates that the record associated with that bit contains the particular item of data. Thus, for example, where a database contains patient records that include a "first name" field, a bit vector of "0010100000" that is associated with the name "Elizabeth" for the "first name" field will indicate that the third and fifth records are for patients named Elizabeth.

Sometimes, in addition to indexing a database, the database itself is stored along with the index rather than maintaining the database as a separately stored structure. For example, in U.S. Pat. No. 4,606,002 to A. Waisman et al., a B-tree is used to store the database data along with an inverted B-tree index that uses keys and associated sparse array bit maps to identify which records contain particular items of data. A record index is used to identify different tables of records (e.g., a table of patient records versus a table of doctor records) and to distinguish between the database data and the indexes. The data is stored using odd numbered record identifiers and the associated indexes are stored using the next even numbered record identifier. Each key and associated sparse array bit map are associated with a range of records and are stored together in the B-tree. The key itself comprises a record identifier, field identifier, data value, and range value, in that order. The record identifier indicates to which table of data the key relates. The field identifier is a numeric identifier of the field within the records to which the key relates. The data value is the actual item of data contained in at least one of the records to which the key relates, and the range value identifies the range of records to which the key relates. The sparse array bit map includes three levels of bit vectors. The bottom level comprises a number of one-byte bit vectors, with the individual bits of each bit vector indicating which records within the associated range of records contain the associated data value in the field specified by the field identifier. The middle level contains one-byte bit vectors in which each bit represents one of the one-byte bit vectors of the bottom level. A bit in the middle level bit vectors is set (to a logical one) if any of the bits in the bottom level bit vector that it represents is set; otherwise it is zeroed. This same structure is carried out to the upper level which includes a single byte representing all of the middle level bit vectors. Where a bit vector would not include any set bits, the bit vector is not allocated and its absence is indicated by its associated bit from the next higher level being zeroed.

As noted by Waisman et al., the use of bit vectors simplifies the processing of boolean expressions since two bit vectors can be combined in accordance with the specified boolean operator and the resulting bit vector represents the records that satisfy the boolean expression. One problem in combining upper level bit vectors in which the bits do not represent individual records is in the processing of NOT expressions. Since a set bit indicates only that at least one (but not necessarily all) records in the associated range of records includes the data value, the NOT operation cannot be accomplished simply by inverting the bit. Rather, as discussed in Waisman et al., the lower level bits that represent individual records must be inverted and used.

Since, in Waisman et al., the data is stored at the bottom level of a B-tree, consecutively numbered records need not be physically stored together. This permits the use of variable length fields and permits fields to be added to the database without having to reorganize the database or make changes to the database management program that is used to access the data. However, this type of database structure can complicate retrieval of records, since the fields of any one record may not all be physically stored together and since separate I/O accesses may often be required for retrieval of even a small group of consecutive records. Given the relative slowness of I/O access, the data storage structure utilized by Waisman et al. can result in undesirably slow retrieval of records.

Accordingly, it is an object of the invention to provide a method and apparatus for managing large amounts of data in a manner that provides the following benefits:

1. Very fast query response;
2. Fast update response;
3. Support for complex retrieval operations, including the combination of multiple keys using boolean logic, with equally fast retrieval for all boolean operators;
4. Minimization of the number of key indexes required;
5. Minimization of the storage space required for the database index;
6. A query response time that is proportional to the number of data items retrieved, rather than the number of data items stored in the database;
7. An extremely fast count operation for preview of retrieval queries and fine-tuning of retrieval criteria; and
8. An ability to handle both high and low cardinality data well in a single unified key index structure.

SUMMARY OF THE INVENTION

In accordance with the present invention there is provided a database system that overcomes the above-noted problems of management of large data sets. The data comprises a plurality of records stored on a data storage device in a computer-readable format. Each of the records includes a number of data fields with at least some of the data fields having a data value stored therein. The records are logically separated into groups, or fine slices, of records with each fine slice containing a preselected maximum number n of records. The fine slices are logically organized into one or more sets, or coarse slices, with each coarse slice containing a preselected maximum number m of fine slices, whereby each coarse slice contains a maximum of n*m records. The database system includes a plurality of indexes, each of which is associated with a different one of the data fields and each of which comprises a number of keys. Each of the data values that are stored within an indexed data field has one or more fine keys and one or more coarse keys associated therewith. The fine keys are each associated with one of fine slices and with a fine bit vector that identifies which of the records contained within that fine slice include the data value associated with that key. The coarse keys are each associated with one of the coarse slices and with a coarse bit vector that identifies which of the fine slices include at least one record having the data value stored therein.

BRIEF DESCRIPTION OF THE DRAWINGS

A preferred exemplary embodiment of the present invention will hereinafter be described in conjunction with the appended drawings, wherein like designations denote like elements, and:

FIG. 4 is a diagrammatic representation of sample vehicle color data for each of a number of records from the database of FIG. 1;

FIG. 6 depicts the index structure for the sample data of FIG. 4;

DESCRIPTION OF THE PREFERRED EMBODIMENT

Data Storage within the Database

Figure 1:
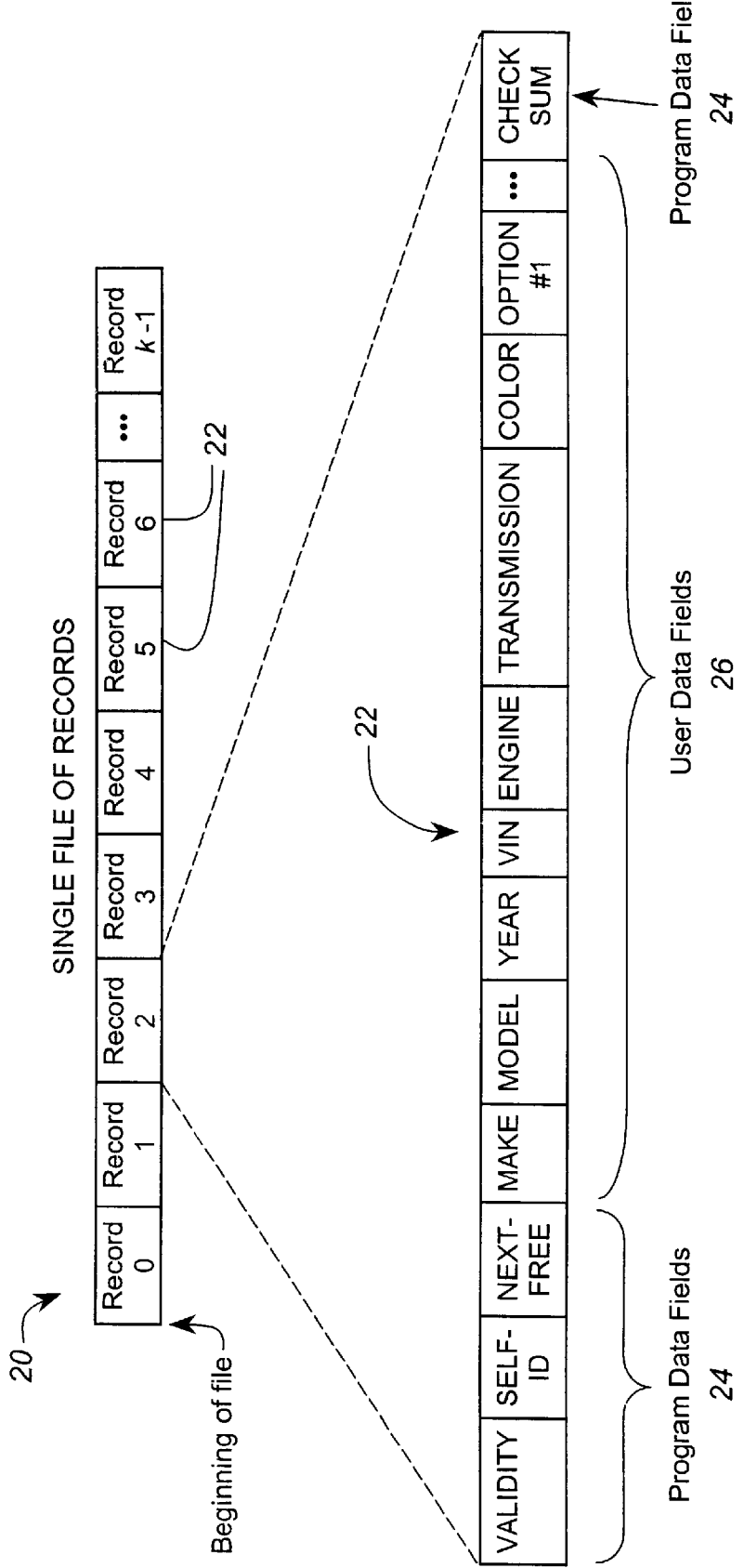
FIG. 1 depicts the structure of an exemplary embodiment of a database used in the present invention.

Referring to FIG. 1, there is shown a database 20 comprising a table of records 22. Each of the records has a fixed length and is assigned a unique record number, starting with zero. This allows the records to be stored sequentially in a single file with the location within the file of any particular record simply being determined by multiplying the record length (in bytes) by that record's assigned record number and using the resulting value as an offset from the beginning of the file. This arrangement provides very simple and fast allocation, de-allocation, and re-use of data record space within the file. Also, by storing all of the records within a single file, entire databases can be easily created or deleted. Creation simply requires creating a new, empty file. Deletion simply requires deleting an existing file. All user access to the database is by way of a database management program which allows the user to add, change, and delete data from the database. As will be discussed below, the database management program supports boolean and other query processing using key-based indexes that provide fast access to the data within the database.

As shown in FIG. 1, the illustrated embodiment of the invention includes a database 20 of vehicle information. Each record 22 has an identical format that includes a number of program data fields 24 and a number of user data fields 26. The program data fields include validity, self-id, next-free, and checksum fields. These fields are not accessible to the user, but are used by the database management program as a part of managing the database, as will be described below. The user data fields 26 include the actual data fields used to store the database data. In the illustrated embodiment, these fields include vehicle make, model, year, VIN, engine, transmission, color, and a number of option fields for storing information about various options a vehicle may have; for example, a sun-roof, aluminum wheels, side-impact airbags, etc. As will be appreciated, the user data fields can be specified by the user as a part of initially setting up the database, with the user specifying the size and data type (e.g., string, date, integer) of each user data field to be included in the database. All fields, both program data fields and user data fields, are fixed length fields so that the records all have a fixed length and can be easily accessed using a calculated offset, as described above.

The validity data field is used to mark the record as either in-use (valid) or deleted (invalid). This is used where a record has used and then deleted by the user, in which case the validity field is used to indicate that the record does not contain valid data and can be re-used. The validity field can be a single bit, although a byte pattern can preferably be used to prevent loss of data due to a corruption of a single bit. The validity field can be used during recovery operations to determine the validity of data contained in the record's fields. This field can be indexed along with the user data fields, as will be described below. The self-id data field contains a unique identification of the record. The self-id comprises the file identifier (e.g., filename of the database) and the record number of the record. This field is used by the database management program to verify that the record is in fact what it is believed to be. The next-free field points to the next free (i.e., deleted) record using the offset of the record to which it points. This field is used to form a stack of deleted records which can be re-used when new data records are added to the database. Finally, the checksum field contains a checksum value computed on the entire contents of the record, except for the checksum item itself. The checksum provides validity checking to insure database consistency and correctness.

Indexing of the Database

To permit keyword searching of user data fields within database 20, all searchable user data fields 26 are indexed with keys that are used to identify which records contain a particular item of data (i.e., data value) within a particular field. Typical queries might be, for example:

VIN=XYZ123

MAKE=Chevrolet

MODEL=Corvette AND YEAR=1975

ENGINE=V6A OR ENGINE=V8G

MODEL=Scout AND (Trans=T3 OR Trans=T4) AND NOT (COLOR=Grey OR YEAR<1969)

Figure 2:
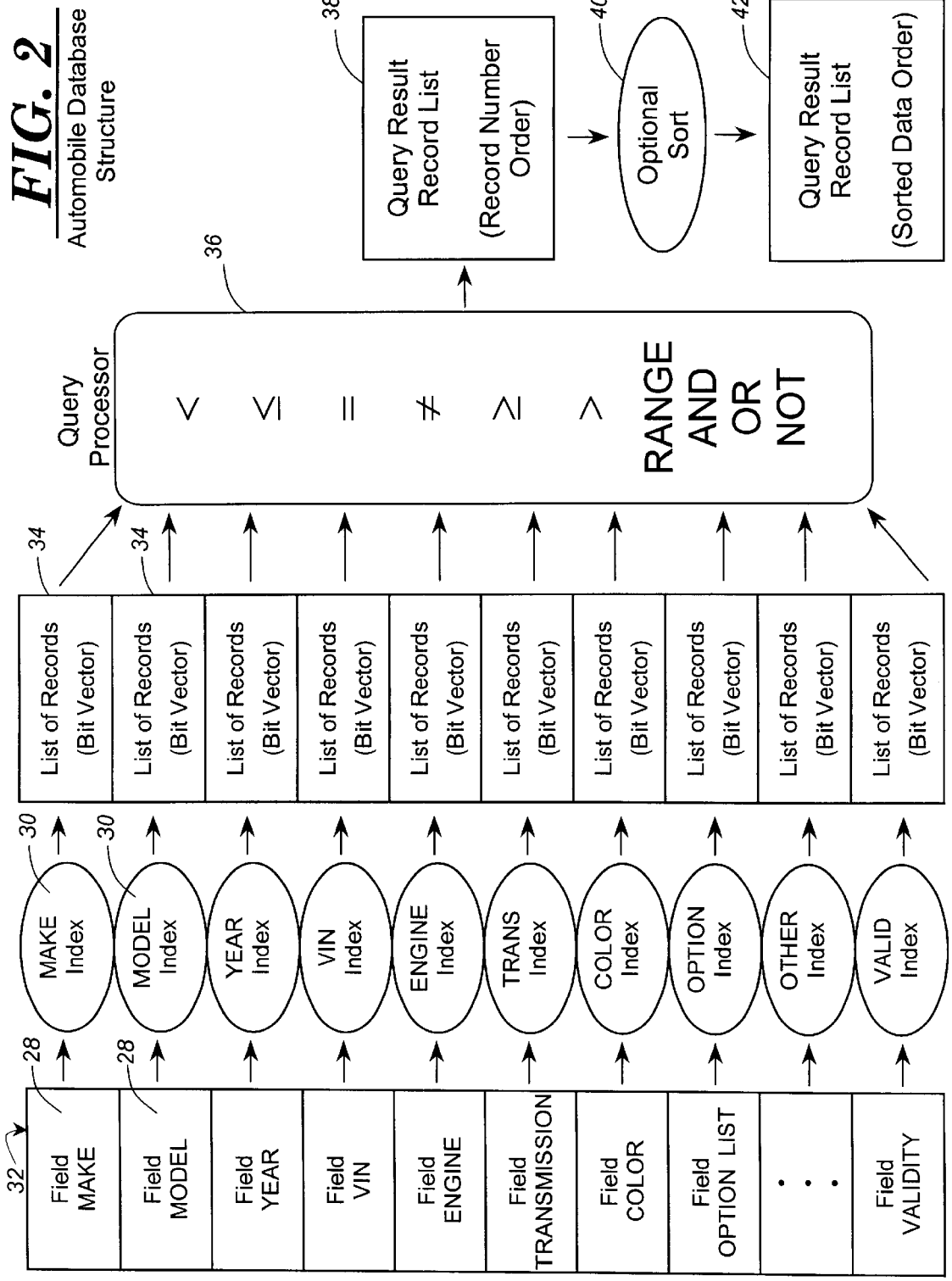
FIG. 2 is an overview of query processing using a key-based index of the present invention.

FIG. 2 provides an overview of how query processing is accomplished using these indexes. For each indexed data field 24 and 26, a pointer 28 is provided which points to an index 30 for that particular data field. The pointers are stored in a table 32 that is separate from the actual database itself. Using the index 30, the database management program obtains a list 34 (represented by one or more bit vectors) of records 22 that contain the keyword used in the query. For boolean and range searches (i.e., for multiple keyword queries), the lists are processed by a query processor module 36 that compares the lists 34 to each other in accordance with the appropriate boolean logic, resulting in a list 38 of records that satisfy the query. The records are then retrieved and, if desired, processed by an optional sort 40, resulting in a final, sorted query result record list 42.

The indexes 30 are actually collections of keys stored in a B-tree. In creating the indexes, separate keys are generated not only for each user data field, but also for each data value that is stored within that data field in at least one of the records. Associated with each key is a link that is used to determine which records contain the data value associated with the key. To optimize the retrieval of records based upon query processing, a hierarchical structure of keys and bit vectors are used, with each key and bit vector representing no more than a certain number of records in the database. Thus, when creating the index, multiple keys and bit vectors are generated for each data value of each data field and the number of keys and bit vectors generated will depend upon the total number of records in the database and the distribution of data among those records. Two types of keys and bit vectors are used: coarse and fine, with the fine keys and bit vectors each representing a group of consecutive records and the coarse keys and bit vectors each representing a set of consecutive fine bit vectors.

Figure 3:
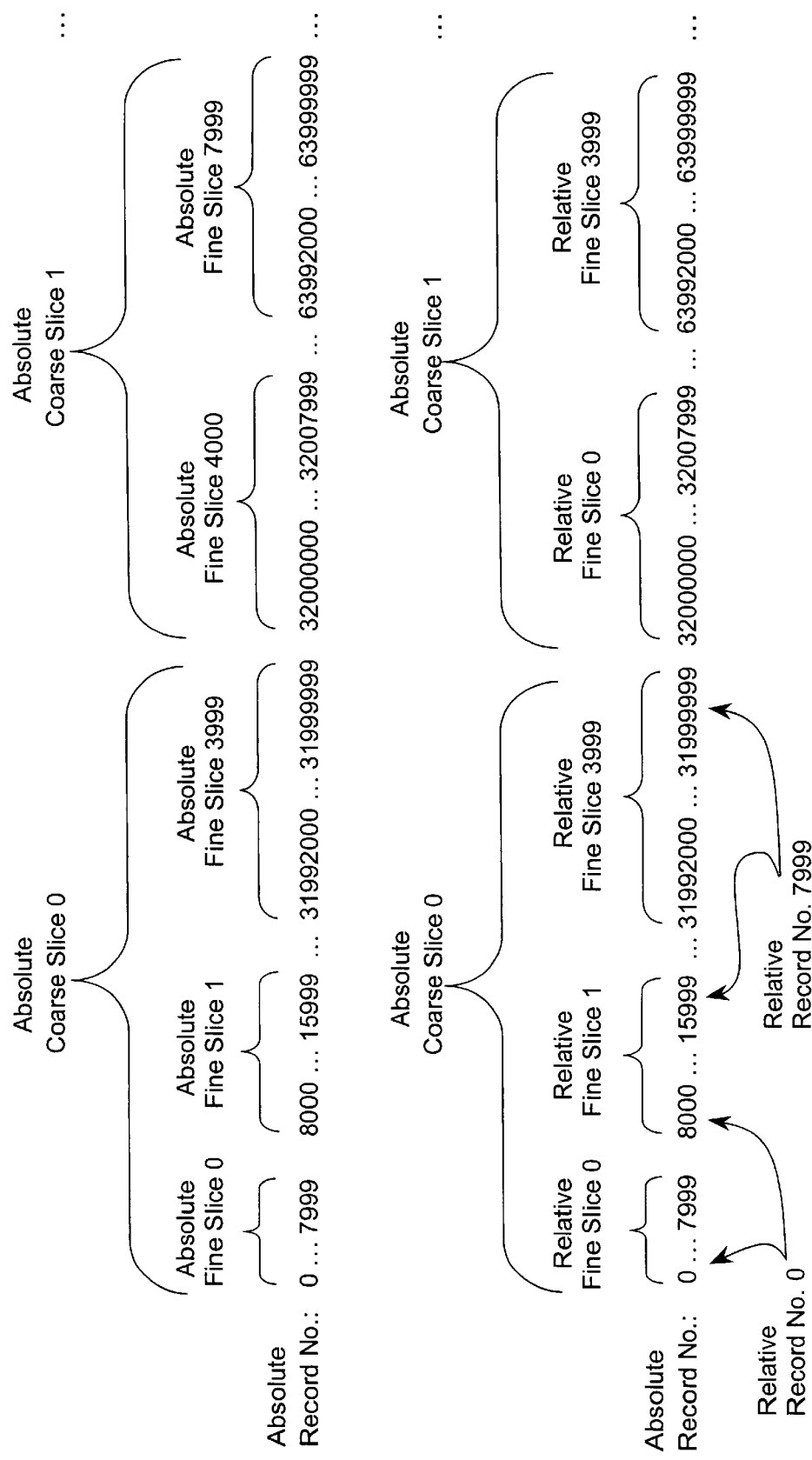
FIG. 3 depicts the logical separation of data records into coarse and fine slices for use in generating database indexes in accordance with the present invention.

The indexing of database 20 using these keys and bit vectors will now be described in detail in connection with FIGS. 3–11. FIG. 3 depicts the logical separation of records into groups of what will be referred to as fine slices, with the fine slices being logically organized into sets of what will be referred to as coarse slices. As shown in the top portion of FIG. 3, each fine slice comprises 8,000 consecutive records and each coarse slice comprises 4,000 consecutive fine slices. Accordingly, a single coarse slice represents 32 million consecutive records in the database. Each fine slice has a unique, absolute fine slice number which, for a given record k and fine slice length fsl, is equal to:

$$k \text{ DIV } fsl,$$

where DIV indicates integer division which returns the integer quotient. Thus, for (absolute) record number 40,420,973 and a fine slice length of 8,000, the absolute fine slice number will be equal to 5,052 (40,420,973 DIV 8,000). Similarly, each coarse slice has a unique, absolute coarse slice number that, for a given record k, a given coarse slice length csl, and a given fine slice length fsl, is equal to:

$$k \text{ DIV } (csl \times fsl).$$

Thus, for record number 40,420,973 with a coarse slice length of 4,000 and a fine slice length of 8,000, the absolute coarse slice number will be 1 (40,420,973 DIV 32,000,000).

Within any particular fine slice, each record 22 can be identified by a relative record number which indicates the position of the record within that particular fine slice. For a given record k, the relative record number is equal to:

$$k \text{ MOD } fsl,$$

where MOD indicates modulus division which returns the integer remainder. Thus, for a fine slice length of 8,000, (absolute) record number 40,420,973 has a relative record number of 4,973 (40,420,973 MOD 8,000). Similarly, within any particular coarse slice, each fine slice can be identified by a relative fine slice number which indicates the position of the fine slice within that particular coarse slice. For a given record k, the relative fine slice number is equal to:

$$(k \text{ MOD } (csl \times fsl)) \text{ DIV } fsl,$$

Thus, for the slice lengths given above, the relative fine slice number for record number 40,420,973 would be 1,052 ((40,420,973 MOD 32,000,000) DIV 8,000). As will be discussed further below, the relative record numbers and relative fine slice numbers are used in connection with the links associated with the fine and coarse keys, respectively.

For purposes of illustration, FIG. 4 provides sample data from database 20 of FIG. 1 showing different data values stored in the "vehicle color" field 26 of a number of records 22 within the database. To aid in understanding the index structure, FIG. 4 also includes columns listing the absolute coarse and fine slice numbers for the records 22, the relative fine slice numbers of the records within a particular coarse slice, and the relative record numbers of the records within a particular fine slice. It will be appreciated that the table of FIG. 4 is simply a logical view of the data and associated slice numbers and does not represent any actual data structure used by the database management program. Also, while the sample data provided in FIG. 4 will be used in connection with the following description and attached drawings, it will be appreciated that the sparseness of the vehicle color data is only provided for the purpose of simplifying the illustration of the database and that, for low cardinality data such as vehicle color, it is probable that most if not all fine slices will contain a large number of records having a particular data value, such as blue.

For each data value of an indexed data field, there will be one key generated for each fine slice and coarse slice that contains at least one record having the data value within the data field. For example, assuming the database contains 160.5 million records, there will be a minimum of 1 coarse key and 1 fine key and a maximum of 6 coarse keys and 20,063 fine keys generated for each item of data, with the actual number of coarse and fine keys depending upon the number and distribution of the data value among the records in the database. For instance, in the sample data of FIG. 4, only records 32,128,000, 32,128,001, and 60,800,000 contain data value="white" in the vehicle color field. Thus, for this data value there will be a total of three keys: one coarse key (since all three records are within the same coarse slice) and two fine keys—one for fine slice 4016, which contains both records 32,128,000 and 32,128,001, and one for fine slice 7,600, which contains record number 60,800,000. These three keys are shown in the sample index of FIG. 6, which will be discussed below.

Figure 5:
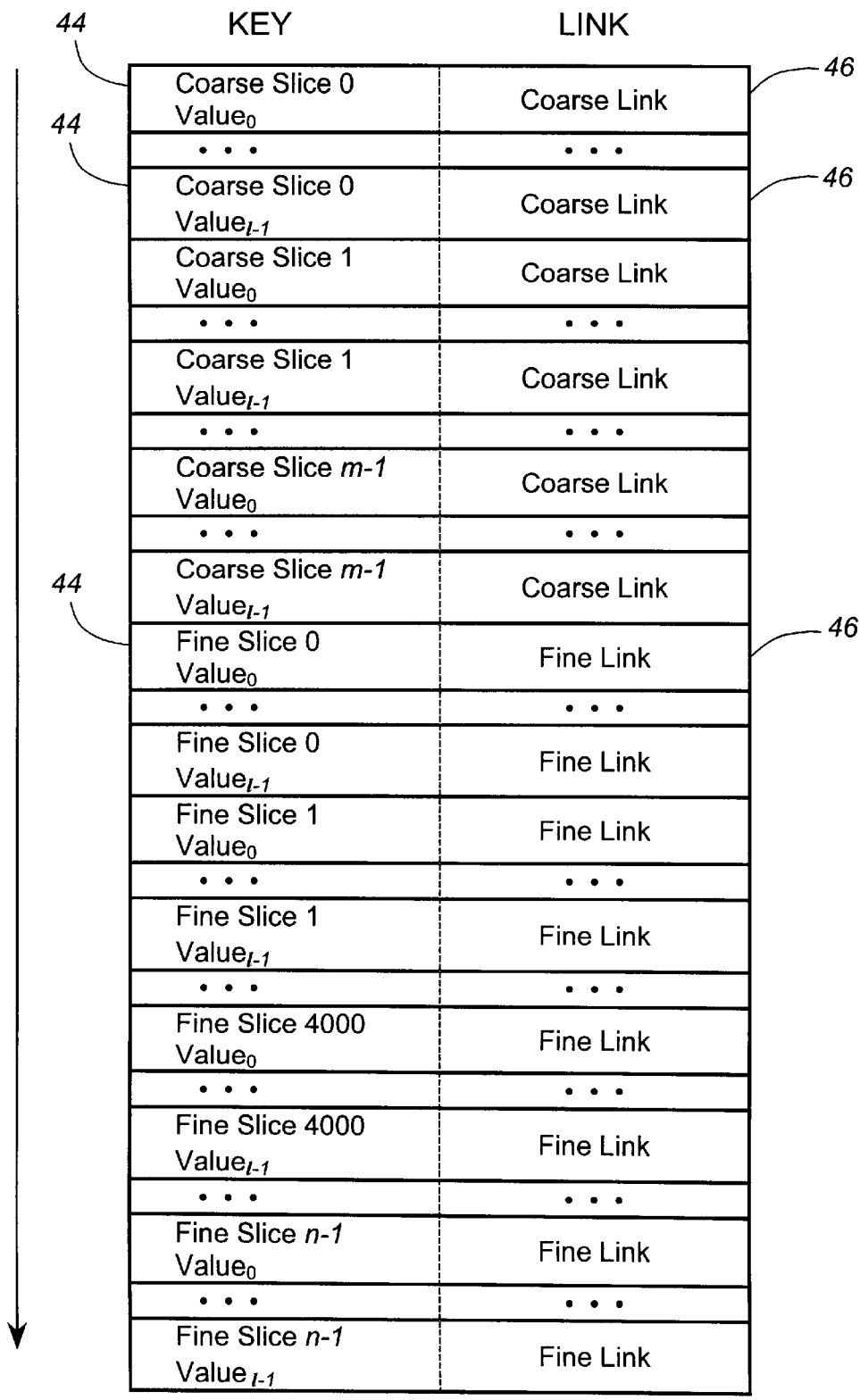
FIG. 5 depicts the general form of the structure of an embodiment of an index constructed in accordance with the present invention.

Referring now to FIG. 5, there is shown the general form of an index 30 for one of the data fields. As mentioned above, the index is comprised of keys 44 and associated links 46, with the key indicating the particular slice and data value with which it is associated and the link being used in determining which records contained in the slice include the data value in the associated user data field. For each data value contained in the data field 26 in at least one record 22 of the database, there will be at least one coarse key 44 and one fine key 44. Very high cardinality data, such as VIN number, may only have a single coarse and fine key, whereas low cardinality data, such as gender, is likely to be found in every fine slice in the database and can therefore require a key for every fine and coarse slice contained in the database. Thus, for any particular data field having data of cardinality l with a number m of coarse slices and a number n of fine slices, the index will logically take the form of FIG. 5, with there potentially being up to (n+m)×l separate keys and links.

As a specific example, FIG. 6 depicts the actual contents of the vehicle color index 30 for the sample data from FIG. 4. The sample index includes a plurality of keys 44 and a link 46 associated with each of the keys. As mentioned above, for each data value (e.g., black, blue, gold, green, etc.) found anywhere in the database in the "color" data field, there is provided a coarse key for each coarse slice and a fine key for each fine slice containing at least one record having that data value within the "color" field. Thus, as explained above, for the color white, there would be one coarse key and two fine keys for the sample database. Although the index can be stored in various formats such as in the table format shown in FIGS. 5 and 6, it is preferably stored in a B-tree as will be discussed in connection with FIG. 11. In whatever form the index is stored, the keys are maintained in order by ascending key value, as will now be described in connection with FIG. 7.

Figure 7:
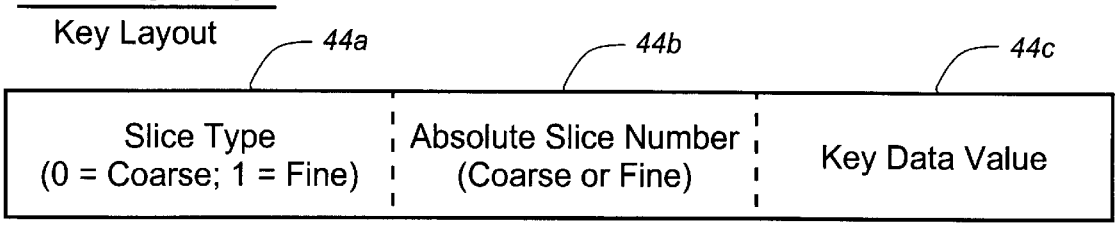
FIG. 7 shows the layout of keys used in the index of FIGS. 5 and 6.

FIG. 7 depicts the format of the keys 44, whether coarse or fine. Each key includes three portions 44a–c that are concatenated together into a single item for ordering of the keys within the index. The first portion 44a is a single bit which indicates the type of key, with a zero indicating that it is a coarse key and a one indicating that it is a fine key. The second portion 44b indicates the absolute slice number for the key, with the first slice being zero. Thus, for a fine key and a fine slice length of 8,000, fine slice 2 would correspond to records 16,000 through 23,999. For a coarse key, coarse slice 2 would correspond to fine slices 8,000 through 11,9999 (and, therefore, records 64,000,000 through 95,999, 999). The third and final portion 44c of a key is the key's data value, which is simply the data value (e.g., black, blue, gold, green, etc.) to which that key corresponds.

Since, for both the fine and coarse slices there is only one key per data value, no two keys will be the same and, consequently, the three portions of the keys that are concatenated together provide a unique key value that is used to maintain the ordering of the keys within the B-tree index. The keys are stored in order of ascending key value. Thus, as shown in FIG. 6, the coarse keys (which begin with a cleared bit) will all be listed in the index before any of the fine keys (which begin with a set bit). Within the group of coarse keys, the keys will then be listed in order of slice number. For two or more coarse keys having the same slice number, the keys will be listed in order of the keys' data values (e.g., black, blue, gold, green, etc.), which may be alphabetically ordered for characters and strings or numerically ordered for integer and decimal numbers. Similarly, the fine keys will be ordered by slice number and, among fine keys having the same slice number, by key data value.

Figure 8:
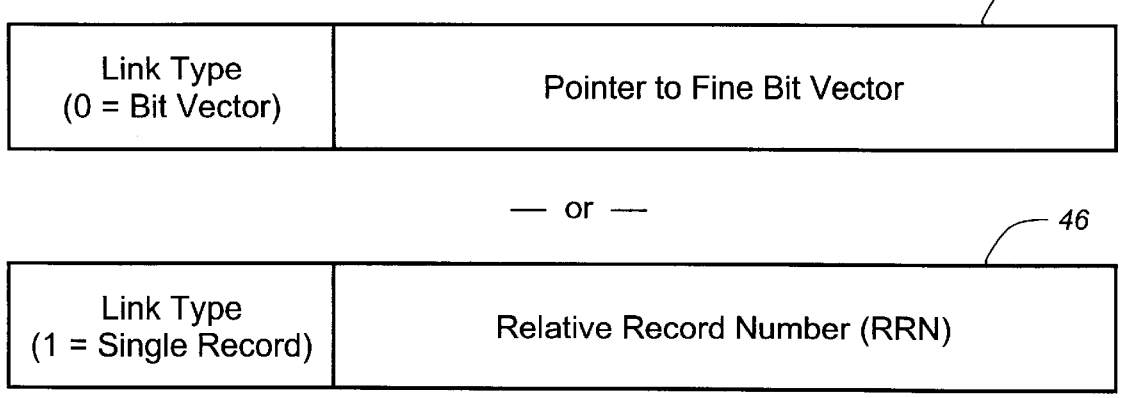
FIG. 8 shows the layout of the fine links used in the index of FIGS. 5 and 6.

As mentioned above, the link 46 associated with each fine key is used to indicate which records within the associated fine slice contain the data value associated with the fine key. Referring now to FIG. 8, the layout for the fine link 46 is shown. The fine link can take either of two forms—a pointer to a bit vector or a relative record number (RRN). The first portion of the link comprises a single bit indicating which type of link it is. A zero (i.e., cleared bit) indicates that the link is a pointer to a bit vector and a one (i.e., set bit) indicates that the link is a relative record number. The first type of link (pointer to a bit vector) is used whenever the fine slice includes at least two records containing the data value. The pointer can either be an offset in the case of the bit vector being stored in the same file as the index, or can be a filename of another file along with an offset, if necessary. In either event the bit vector will include one bit for each record within the fine slice which, in the illustrated embodiment, would be 8,000 bits, with the first bit indicating whether or not the first record in the fine slice contains the data value, the second bit indicating whether or not the second record contains the data value, and so on for each of the remaining records in the fine slice. The second type of link is used whenever there is only one record within the fine slice that contains the associated data value. In that case, the fine link provides the relative record number of that one record.

Referring back to FIG. 6, the two fine keys for slice 1 provide an example of these two types of links. The first fine key associated with slice 1 has a value of blue and can be represented as f:1:blue, with "f" indicating that it is a fine key, the "1" being the absolute slice number, and "blue" being the data value to which the key relates. As indicated in FIG. 6, the link associated with key f:1:blue is of type 0, meaning that the link contains a pointer to a bit vector 48. In this case bit vector 48 contains a set bit (logical one) in bit positions 0 and 2. All other bit positions are cleared to a zero. This indicates that relative record numbers 0 and 2 of fine slice 1 contain blue in the vehicle color field. Referring back to the sample database of FIG. 4, it will be evident that this is correct—records 8,000 and 8,002 (which are relative records 0 and 2 of fine slice 1) contain the value "blue" in the vehicle color field.

Turning back to FIG. 6, the second key for fine slice 1, namely, f:1:red, has a link of type 1, meaning that the link does not contain a pointer, but instead provides the relative record number (RRN=1) of the only record within fine slice 1 that contains "red" in the vehicle color field. Referring again to FIG. 4, it will be seen that relative record number 1 (which is absolute record number 8001) is in fact the only record within fine slice 1 that contains the value "red" in the vehicle color field. For high cardinality data such as a VIN, there will be a great number of keys created (since the number l of potential data values will be high) but very few records (often only one record) with the data value. Thus, where a slice has only a single record containing the data value, the storage of a record number within the link rather than both a pointer and an almost 1 KB bit vector can result in the saving of large amounts of storage memory.

Figure 9:
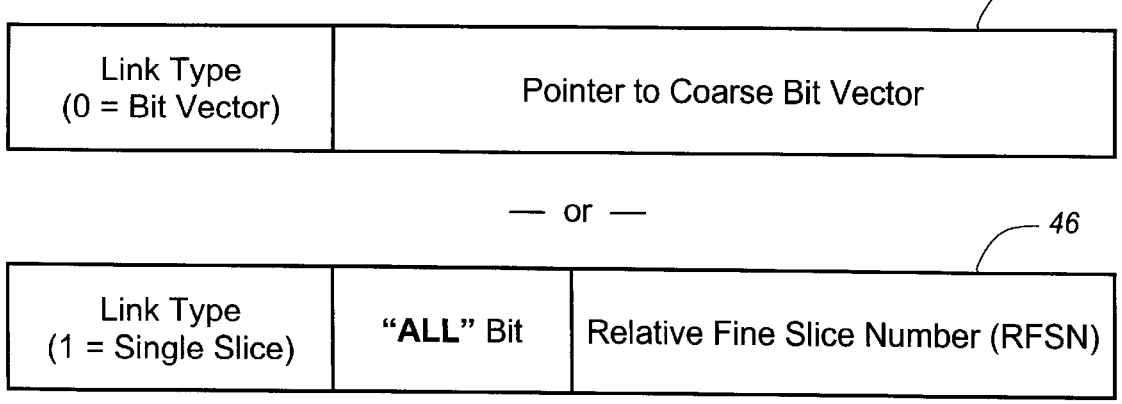
FIG. 9 shows the layout of the coarse links used in the index of FIGS. 5 and 6.

Referring now to FIG. 9, the layout is shown for the coarse links that are associated with the coarse keys. As with the fine links, the coarse links can be either of two types which are identified using a single bit at the beginning of the link. The first type is indicated by a zero bit and contains a pointer to a bit vector that represents each of the fine slices within the associated coarse slice. The second type is indicated by a one bit and is used whenever the coarse slice contains only one fine slice having any records that contain the data value. In this case the link contains the relative fine slice number (RFSN) of that one fine slice. Note that, in addition to the relative fine slice number, the second type of link also includes a single "ALL" bit which, as will be discussed below in greater detail, is used to indicate whether or not all of the records within the fine slice include the data value.

Examples of these two types of coarse links can be seen in FIG. 4. As shown therein, the value "orange" is found in records contained within fine slices 8, 20, and 3,000, all of which are within coarse slice 0. Thus, in FIG. 6, key c:0:orange (coarse slice 0, orange) has associated with it a link that contains a pointer to a bit vector 48 in which bit positions 8, 20, and 3,000 are set to one and the others cleared to zero. As another example, while the value "green" is found in more than one record of the database of FIG. 4, it is only located in one record within coarse slice 0. Thus, key c:0:green of FIG. 6 includes a link that is not a pointer to a bit vector, but rather is the relative fine slice number (RFSN=0) of the fine slice that contains the record having "green" in the vehicle color field.

Figure 10:
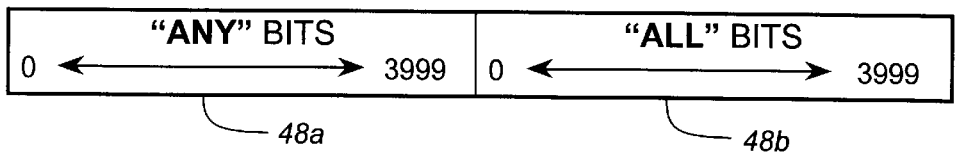
FIG. 10 shows the layout of the coarse bit vector used in the index of FIGS. 5 and 6.

With reference to FIG. 10, it will be seen that, unlike the fine bit vectors 48, the coarse bit vector 48 is actually two different bit vectors concatenated together. The first of these two bit vectors includes what will be referred to as "ANY" bits, with the ANY bit vector 48a including a single ANY bit for each of the 4,000 fine slices contained within the coarse slice. An ANY bit is used to indicate whether any of the records contained within its associated fine slice has the data value in its associated field. If so, the ANY bit is set to one. Thus, an ANY bit will be zero only if none of the records within its associated fine slice contain the data value. The second of these two bit vectors includes what will be referred to as "ALL" bits, with the ALL bit vector 48b also including a single ALL bit for each of the 4,000 fine slices.

An ALL bit is used to indicate that all of the records contained within its associated fine slice have the data value. If so, the ALL bit is set to one. If the data value is not included within even a single record within the fine slice, then the corresponding ALL bit is cleared to zero. As will be discussed below, the ALL bit is useful in processing queries involving the NOT operator.

As discussed above, where a particular data value does not exist in any of the records contained in a particular fine slice, no fine key is created. Thus, where an ANY bit in a coarse key is zero, no fine key is created for the fine slice associated with that ANY bit. Similarly, where a particular data value does not exist within any of the records contained in a particular coarse slice, no coarse key or fine keys are created for that coarse slice. Thus, in FIG. 6, there is no coarse 0 key for "silver" because none of the first 32 million records contain silver in the vehicle color field. Rather, the only keys for silver are a coarse slice 1 key which has a link to its relative fine slice 23, and a fine slice 4023 key which has a link to its relative record number 0 (which is absolute record number 32,184,000), which as shown in FIG. 4 is the only record listing silver as the vehicle color.

Figure 11:
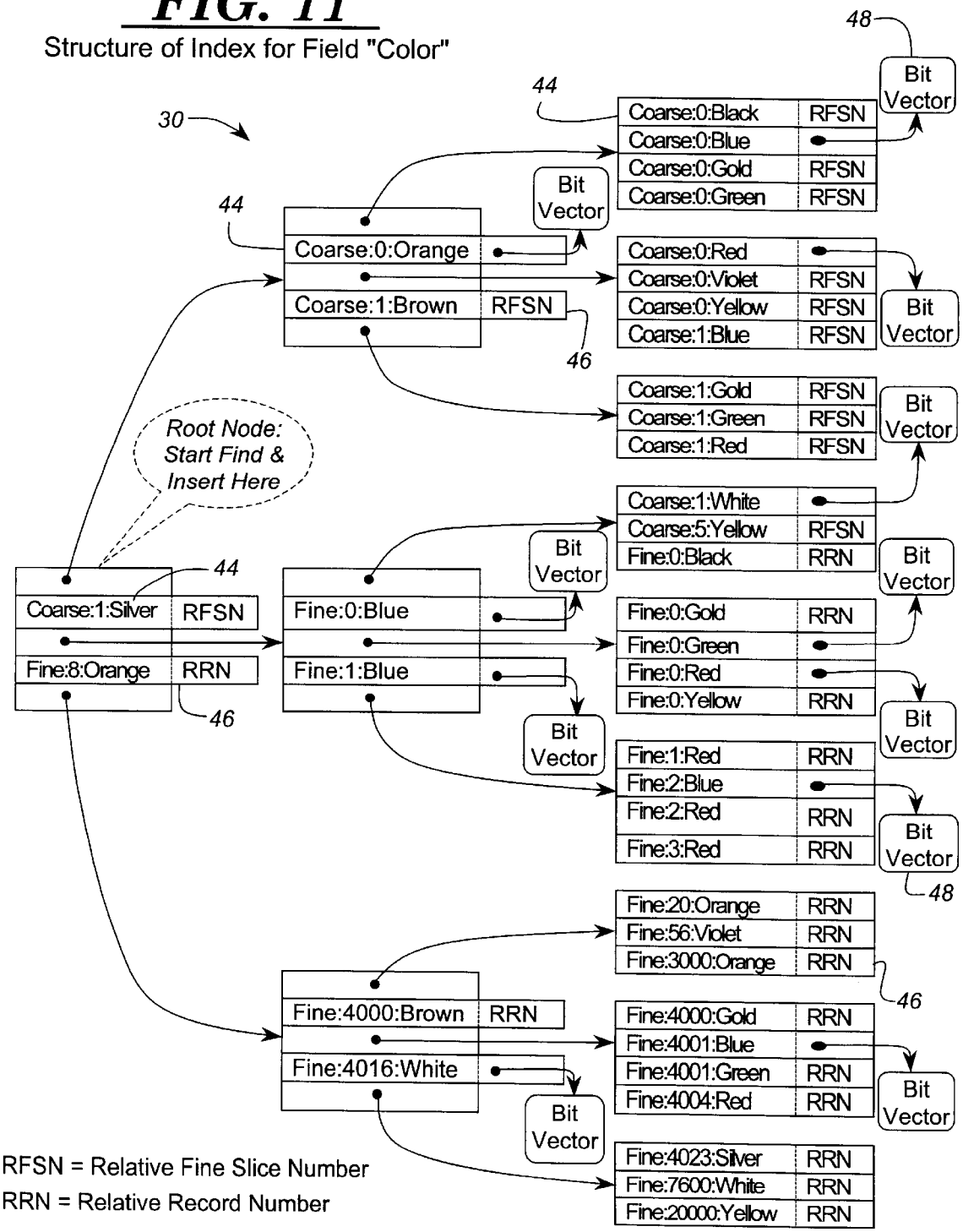
FIG. 11 depicts the B-tree structure which is used to store the keys and links of the index of FIG. 6.

Referring now to FIG. 11, there is shown the actual structure of an index 30; in particular, the index for field "color". The index is stored as a B-tree with keys 44 stored not just at the leaves of the tree, but also at the root and intermediate nodes. This provides faster searching of the B-tree on average, since the search need not traverse all levels of the tree when searching for a key that happens to be located either at the root or an intermediate node. Also, the levels in the tree decrease faster due to deletions of keys that in traditional B-tree structures, since a sole key is never left at a terminal node, but is instead moved up to the next level node. Furthermore, the keys at the root and intermediate nodes are used to determine the search path through the tree. This saves storage space because the data stored at the root and intermediate nodes that is used to determine the search path through the tree is not duplicative of data stored at the leaves of the tree, as in traditional B-trees.

Query Processing Using the Indexes

Figure 12:
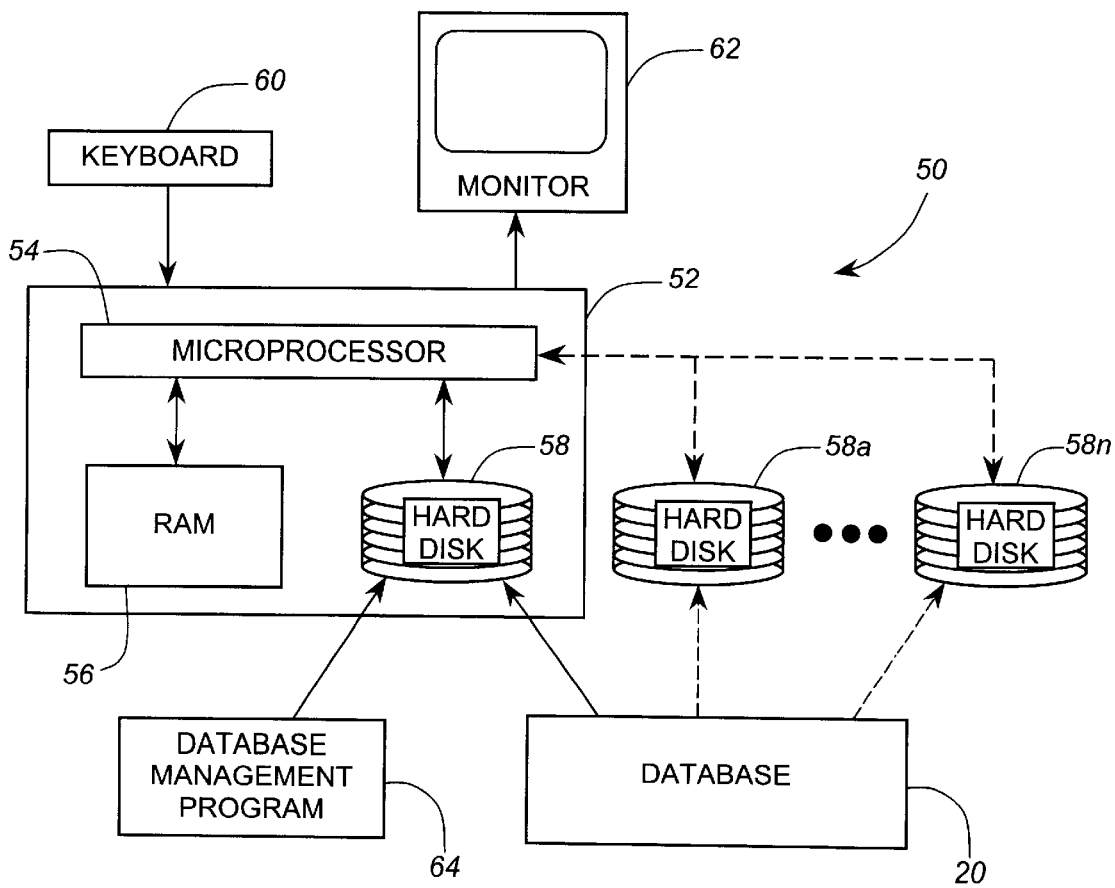
FIG. 12 is a block diagram of a computer system for use in implementing the present invention.

Referring now to FIG. 12, there is shown a computer system 50 for use in implementing the database, index structure, and query processing of the present invention. Computer system 50 includes a computer 52 having a microprocessor 54, RAM 56, a hard disk 58, a keyboard 60, and monitor 62. Computer 52 can be any of a number of commercially-available personal computers running an operating system such as WindowsNT®, with microprocessor 54 comprising an Intel® Pentium® II or equivalent processor. Database 20 is stored as a single file on a computer-readable memory such as a hard drive 58. Similarly, each of the indexes are stored on hard drive 58 as a separate file. Hard drive 58 can comprise a fixed magnetic disk or other non-volatile data storage. Depending upon the size of database 20, the non-volatile data storage device may comprise a number of hard drives 58a–n, such as in a RAID array, with the database spanning two or more of these hard drives. As mentioned above, the database management program 64 is used to setup and maintain the database 20 and its indexes, as well as to perform query processing and associated retrieval of records using the indexes. As with database 20, database management program 64 is also stored in computer-readable format on hard drive 58. As will be appreciated, computer 52 can be a server attached via a network interface card (not shown) to a network, whether it be a local area network or a global computer network such as the Internet.

Query processing is implemented by computer 52 by way of microprocessor 54 executing instructions from database management program 64. Program 64 locates the one or more records that satisfies a particular user query by creating a target keys (e.g., c:0:blue) for each coarse and fine slice and then searches the appropriate index for those target keys, starting with the lowest key valued key (i.e., coarse slice 0). If no key is found, a bit vector of all zeros is returned. If a matching key is found in the index, then the associated link is used to obtain a bit vector for that key. If the link is of type 0, as shown in FIGS. 8 and 9, then the bit vector identified by the link is returned. Where one or both of the keys' links are of type 1; that is, they contain a relative fine slice number (in the case of a coarse key) or a relative record number (in the case of a fine key) rather than a pointer to a bit vector, then a bit vector is created and, for a fine bit vector, the bit corresponding to the record identified by the link is set to one and the remaining bits of the vector being cleared to zero. When creating a coarse bit vector (which includes both ANY bits and ALL bits), the ANY bit corresponding to the fine slice number identified by the link is set to one, with the remaining ANY bits being cleared to zero, and the ALL bit corresponding to the fine slice number identified by the link is set to the same value (0 or 1) as the ALL bit contained in the link, with the other ALL bits being cleared to zero. In this way, query processing can always be carried out using bit vectors, regardless of which type of link is stored in the index.

In the case of simple queries, such as MAKE=Chevrolet, once a coarse bit vector has been obtained, it can be used to determine which fine slices contain records satisfying that query. The keys for those fine slices (e.g., f:0:Chevrolet) can then be accessed, in order of their key value, and their associated bit vectors obtained. As records containing the data value are identified, they are retrieved for processing.

For boolean operations, such as would be required for a query of MODEL=Corvette and YEAR=1975, corresponding bit vectors for each of the keyword search terms are obtained in the manner described above, and then are logically combined in accordance with the boolean logic (AND) specified in the user's query. The following operators are used to perform boolean operations on the bit vectors:

AND_BV

This is a binary operator, taking two bit vector parameters, and returning a single bit vector result. All bits of the two bit vectors are logically AND-ed together, yielding a single result bit vector. The operation is identical for coarse and fine bit vectors.

OR_BV

This is a binary operator, taking two bit vector parameters, and returning a single bit vector result. All bits of the two bit vectors are logically OR-ed together, yielding a single result bit vector. The operation is identical for coarse and fine bit vectors.

NOT_BV

This is a unary operator, taking one bit vector parameter, and returning a single bit vector result. All bits of the one bit vector are logically NOT-ed (complemented), yielding a single result bit vector. The operation is different for coarse and fine bit vectors. For fine bit vectors, all bits are simply NOT-ed in place. For coarse bit vectors, the ANY and ALL bits are NOT-ed and then the ANY and ALL bit vectors are swapped; that is, the ALL bit vector is moved to the left portion of the coarse bit vector as shown in FIG. 10 and thereby becomes the ANY bit vector for the NOT-ed coarse bit vector. Similarly, the ANY bit vector is moved to right portion of the coarse bit vector so that it becomes the ALL bit vector of the NOT-ed coarse bit vector.

The following are basic "find" operators that are used in searching through an index to obtain a bit vector for specified target keys or key ranges.

FIND_EQUAL_BV

This operator searches an index to find the key that matches the specified target key, which is a parameter to this operator. There will be at most one entry in the B-tree matching the target key. If the target key doesn't exist, a bit vector of all zero bits is created and returned. At the end of this operator, a current path structure is created pointing to the location in the B-tree where the target entry was found, or where it would have been found if it had existed, and the target key is saved for use by the FIND_NEXT_BV operator discussed below.

FIND_NEXT_BV

This operator searches an index to find the next key whose field Slice Type and Absolute Slice Number values (see FIG. 7) match the target key's field Slice Type and Absolute Slice Number values. Thus, the key data value portion of the key is ignored. The target key is the target key saved by the last previous FIND_EQUAL_BV operator. There can be any number of entries in the B-tree matching the target key. If the next target key does not exist, a special completed result value is returned to indicate that no more entries exist matching the target key. The search starts from the current path created by the last previous FIND_EQUAL_BV operator, or updated by the last previous FIND_NEXT_BV operator. At the end of this operator, the current path structure is updated to point to the location in the B-tree where the next target key was found.

The following are relational "find" operators that are used to search through an index. Each execution of one of these operators finds one or more target keys in an index, and returns the bit vector, either coarse or fine, associated with the target keys. If multiple keys are found, their associated bit vectors are logically OR-ed together to form a single result bit vector. This single result bit vector is an accumulation of all the keys found in the search. Each operator executes on a single Slice Type value and Absolute Slice Number value. Depending on the operator, it executes on one or more Key Data Values. These operators are executed multiple times to operate on more than one Slice Type or Absolute Slice Number.

FIND_LSS_SLICE

This operator searches an index to find all entries whose Key Data Value (see FIG. 7) is less than the specified target key, which is a parameter to this operator. It operates as follows. A FIND_EQUAL_BV operator is executed on the target key, generating an initial FIND_LSS_SLICE result bit vector. The FIND_NEXT_BV operator is executed continuously until it returns a completed result. Each execution result bit vector is logically OR-ed with the OR_BV operator into the FIND_LSS_SLICE result bit vector. The FIND_LSS_SLICE result bit vector is logically NOT-ed with the NOT_BV operator. The FIND_LSS_SLICE result bit vector is returned as the operator result.

FIND_LEQ_SLICE

This operator searches an index to find all entries whose Key Data Value is less than or equal to the specified target key, which is a parameter to this operator. It operates as follows. A FIND_EQUAL_BV operator is executed on the target key. The initial FIND_LEQ_SLICE result bit vector is set to all zero bits. The FIND_NEXT_BV operator is executed continuously until it returns a completed result. Each execution result bit vector is logically OR-ed with the OR_BV operator into the FIND_LEQ_SLICE result bit vector. The FIND_LEQ_SLICE result bit vector is logically NOT-ed with the NOT_BV operator. The FIND_LEQ_SLICE result bit vector is returned as the operator result.

FIND_EQL_SLICE

This operator searches an index to find all entries whose Key Data Value is equal to the specified target key, which is a parameter to this operator. It operates as follows. A FIND_EQUAL_BV operator is executed on the target key, generating a FIND_EQL_SLICE result bit vector. The FIND_EQL_SLICE result bit vector is returned as the operator result.

FIND_PEQL_SLICE

This operator searches an index to find all entries whose Key Data Value is partially equal to the specified target key, which is a parameter to this operator. Partially equal means that the entry Key Data Value matches the specified target key for the length of the target key's Key Data Value (the target key is a partial Key Data Value). It operates as follows. A FIND_EQUAL_BV operator is executed on the target key, generating an initial FIND_PEQL_SLICE result bit vector. The FIND_NEXT_BV operator is executed continuously until it returns a completed result, or the next key's Key Data Value is greater than the target Key Data Value. Each execution result bit vector is logically OR-ed with the OR_BV operator into the FIND_PEQL_SLICE result bit vector. The FIND_PEQL_SLICE result bit vector is returned as the operator result.

FIND_NEQ_SLICE

This operator searches an index to find all entries whose Key Data Value is not equal to the specified target key, which is a parameter to this operator. It operates as follows. A FIND_EQUAL_BV operator is executed on the target key, generating an initial FIND_NEQ_SLICE result bit vector. The FIND_NEQ_SLICE result bit vector is logically NOT-ed with the NOT_BV operator. The FIND_NEQ_SLICE result bit vector is returned as the operator result.

FIND_GEQ_SLICE

This operator searches an index to find all entries whose Key Data Value is greater than or equal to the specified target key, which is a parameter to this operator. It operates as follows. A FIND_EQUAL_BV operator is executed on the target key, generating an initial FIND_GEQ_SLICE result bit vector. The FIND_NEXT_BV operator is executed continuously until it returns a completed result. Each execution result bit vector is logically OR-ed with the OR_BV operator into the FIND_GEQ_SLICE result bit vector. The FIND_GEQ_SLICE result bit vector is returned as the operator result.

FIND_GTR_SLICE

This operator searches an index to find all entries whose Key Data Value is greater than the specified target key, which is a parameter to this operator. It operates as follows. A FIND_EQUAL_BV operator is executed on the target key. The initial FIND_GTR_SLICE result bit vector is set to all zero bits. The FIND_NEXT_BV operator is executed continuously until it returns a completed result. Each execution result bit vector is logically OR-ed with the OR_BV operator into the FIND_GTR_SLICE result bit vector. The FIND_GTR_SLICE result bit vector is returned as the operator result.

FIND_RANGE_SLICE

This operator searches an index to find all entries whose Key Data Value is greater than or equal to the specified minimum target key, and less than or equal to the specified maximum target key, which are parameters to this operator. It operates as follows. A FIND_EQUAL_BV operator is executed on the minimum target key, generating an initial FIND_RANGE_SLICE result bit vector. The FIND_NEXT_BV operator is executed continuously until it returns a completed result, or the next Key Data Value is greater than the maximum target key's Key Data Value. Each execution result bit vector is logically OR-ed with the OR_BV operator into the FIND_RANGE_SLICE result bit vector. The FIND_RANGE_SLICE result bit vector is returned as the operator result.

Retrieval of Records

As a result of the query process, a list of absolute record numbers is generated, with the list representing a subset of all of the records contained in the database. The records are listed in record number order as an inherent result of the index structure and query processing techniques described above. The retrieval operation is used to select and retrieve from database 20 the list of records generated as a result of the query processing. The retrieval operation described is designed to provide very fast retrieval response.

Figure 13:
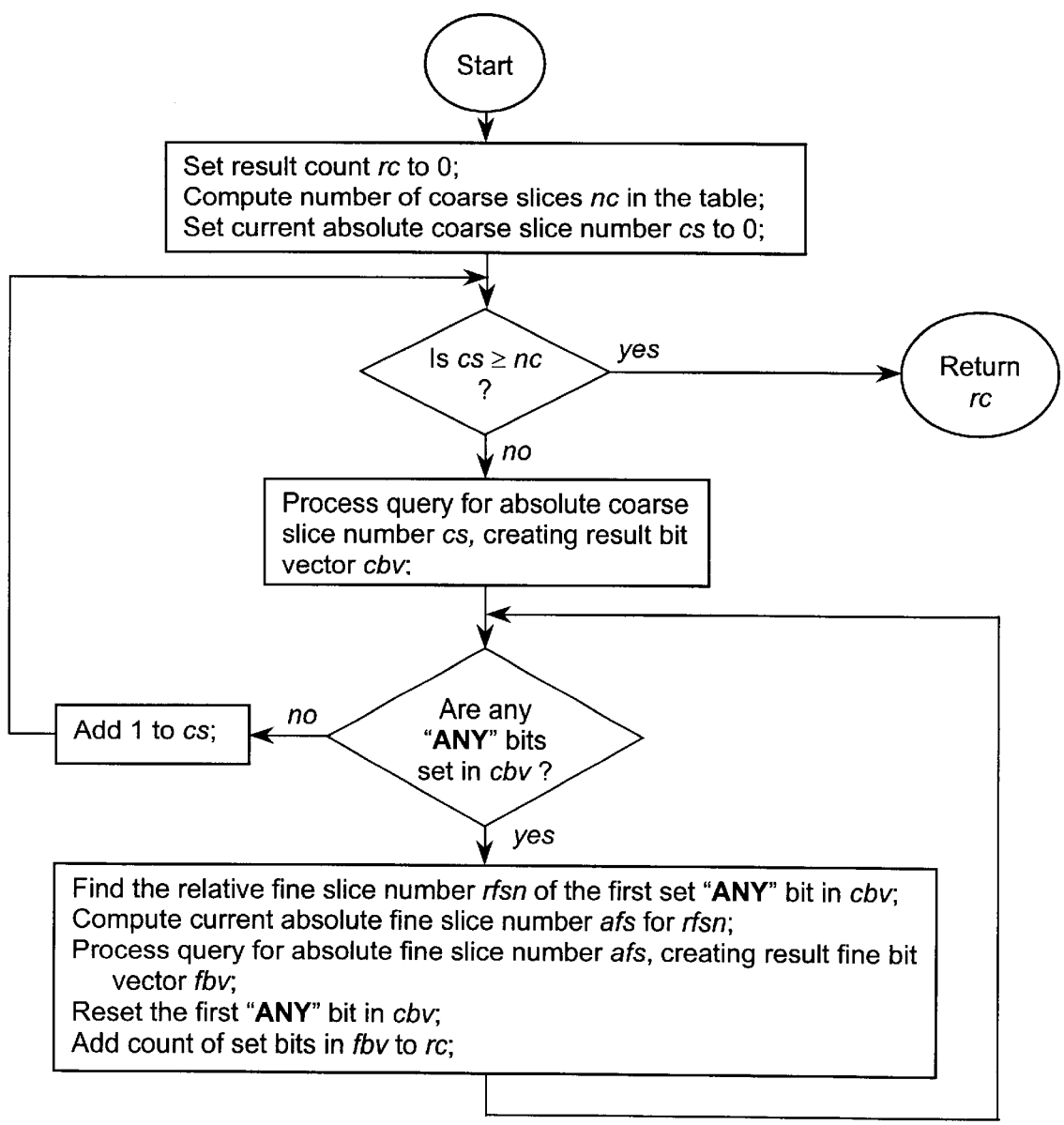
FIG. 13 is a flow chart depicting a process in accordance with the present invention for counting the number of records that satisfy a given query.
Figure 14:
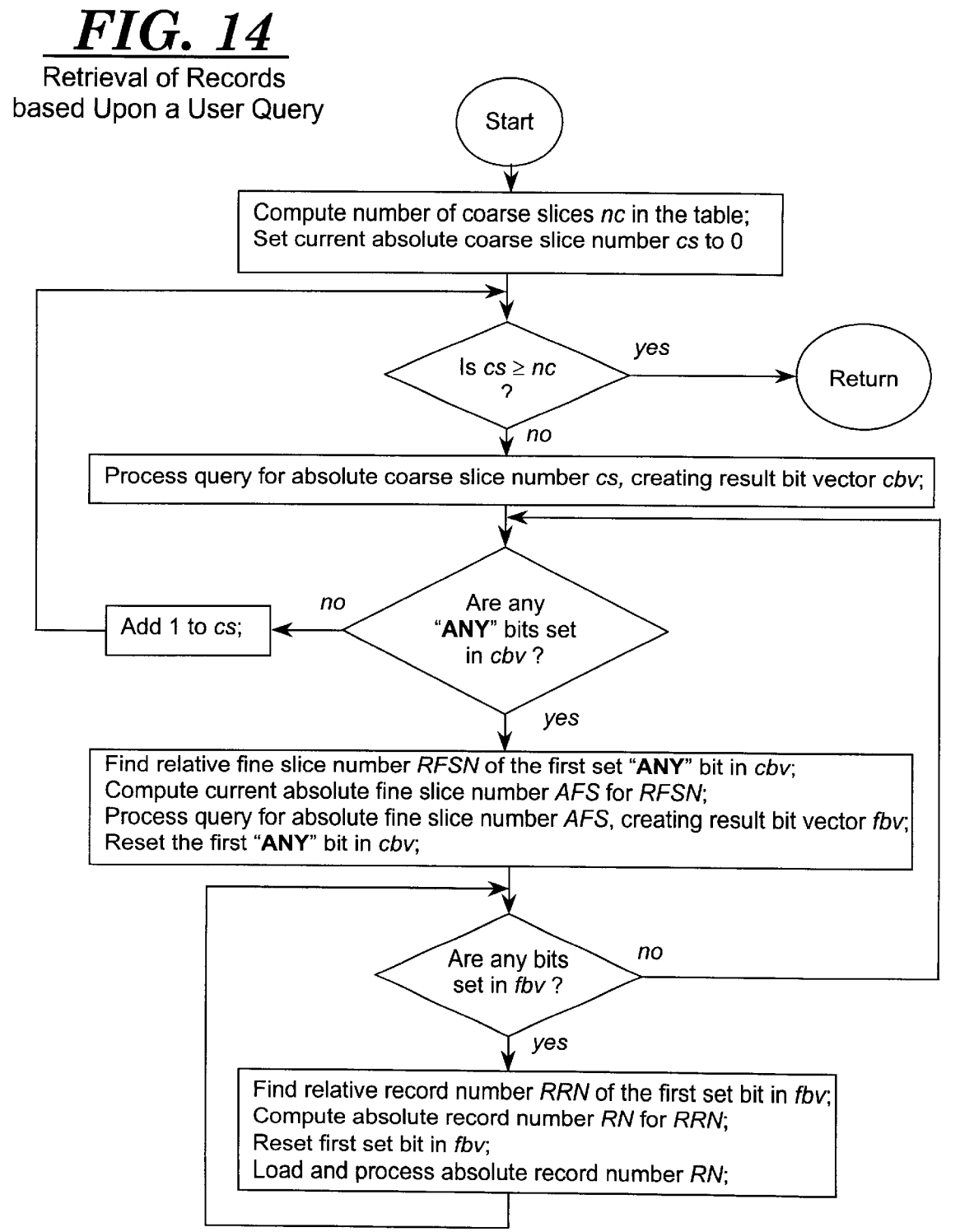
FIG. 14 is a flow chart depicting a process in accordance with the present invention for retrieving the records that satisfy a given query.

In the preferred embodiment, there are two types of retrieval operations: COUNT and FIND. A COUNT retrieval simply counts the selected subset of records. Since the records themselves don't need to be retrieved, this operation is extremely fast. The retrieval operation to select and COUNT a subset of records from a database is shown in FIG. 13. A FIND retrieval retrieves each of the records in the subset. The retrieval operation to select and FIND a subset of records from a database is shown in FIG. 14. Since the selection operation rapidly identifies the selected records, the retrieval time is in general proportional to the number of records selected, not the number of records in the data record table.

A unique aspect of the retrieval operation is that it operates by examining the indexes in record number order first, and then field value order, rather than field value order first, and then record number order. One reason this is possible is that, as shown in FIG. 11, the index B-tree is organized and ordered for efficient index-sequential operation in this search order. A given slice and data value combination can be efficiently located in the index B-tree. This is accomplished using normal B-tree search methods, starting at the top of the tree, and utilizing a binary search in each tree node, until the target index entry is found. Since all of the field values for the given slice are stored in sequential entries in the B-tree immediately preceding and following the target key, they may be retrieved easily and extremely quickly. A second reason this is possible is the combination of coarse and fine bit vectors. As a result of this combination, a single coarse bit vector represents 32,000,000 records. This means that by processing a single coarse slice for the retrieval criteria, 32,000,000 records have been processed, and the fine slices of interest in the current coarse slice have been identified. From there only the fine slices of interest are directly accessed and processed 8,000 records at a time. Then only the individual records of interest are counted or retrieved. A third reason this is possible is the ability to logically NOT a bit vector rapidly. For example, the NOT EQUAL criteria is implemented by finding the bit vector EQUAL to the criteria, and NOT-ing this bit vector. This is much faster than finding all the bit vectors NOT EQUAL to the criteria. The special capability of a coarse bit vector to contain both "ANY" and "ALL" bit vectors allows the NOT operation to work as effectively on coarse bit vectors as on fine bit vectors. Yet a fourth reason this is possible is the ability to rapidly evaluate a LESS THAN, LESS THAN OR EQUAL, GREATER THAN, GREATER THAN OR EQUAL, or RANGE criteria by simply OR-ing together bit vectors stored sequentially in the index. Since each coarse bit vector represents 32,000,000 records, it is much faster to enumerate the Key Data Values within a slice this way, than to find the Key Data Values first, and then enumerate the record numbers. Thus, the retrieval criteria is quickly processed in record number order 32,000,000 records at a time. Even with a record count of 1 billion records, only 32 coarse slices would need to be examined.

During execution of the criteria code, the validity index (see FIG. 2) may be used by the retrieval operation. The validity index is a standard index with a one bit for every in-use data record, and a zero bit for every deleted data record. If a NOT_BV operator is executed at any time in the criteria code, a flag is set specifying that the validity index is needed. This flag is needed because a zero bit in a bit vector represents deleted data records as well as data records not matching the current criteria. If this flag is set at the end of execution of the query processing, the validity index bit vector for the current coarse or fine slice is AND-ed in to the current result bit vector with the AND_BV operator. This eliminates deleted records which were introduced by the NOT_BV operator from the final result bit vector.

The database must be locked against update during certain portions of the retrieval operation. The retrieval operation is optimized to reduce the number of times and duration of this locking. The database is locked with a shared-lock (reader lock) only during execution of the query process. This allows any number of other retrieval operations on the table to proceed concurrently, while temporarily locking out update operations. The database is locked at the beginning of the query processing, and unlocked at the end of the query processing. Since the query is executed a slice at a time (via the bit vector mechanism), a single lock-unlock cycle covers query processing for 32,000,000 records for coarse slices, and 8,000 records for fine slices. The design of the index makes criteria code execution very simple and quick. In this way, the number of lock-unlock cycles is minimized, and the duration of the time the database is locked against update is minimized.

The database is unlocked during the loading and processing of retrieved data records. This creates the possibility of a data record being modified between the time the query is executed, and the time the data record is loaded. This means that the actual data record loaded could no longer match the retrieval criteria. This problem is avoided by assigning a unique update transaction number to each data record update. This update transaction number is stored in the data record itself. The then-current update transaction number is captured and stored by the retrieval operation during the execution of the query. When a data record is loaded during a retrieval operation, its update transaction number is compared against the query's update transaction number. If the data record update transaction number is higher, it means the data record has been updated since the execution of the query, and may no longer match the retrieval criteria.

When this condition is detected, the updated data record is not processed. Instead, the retrieval operation is interrupted, and restarted at the current coarse and fine slices. The query is re-executed for the current coarse slice and then for the current fine slice. Processing of the current fine slice is then restarted at the bit represented by the record number which was being loaded and processed at the time of the interruption. This insures that the data record is consistent with the newly executed query, and processing resumes (unless the data record has been updated again, in which case the interruption/restart will be repeated). Thus, the retrieval operation can evaluate retrieval criteria for large numbers of records at a time, with minimal locking, while providing consistency of results. The method of retrieval operation processing in record number order provides the ability of interrupting and restarting retrieval at any record number location simply and effectively.

It will thus be apparent that there has been provided in accordance with the present invention a database method and apparatus which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, to conserve storage memory, the size of the data value portions of the keys can be made variable rather than being fixed at a size selected to accommodate the larger data values. All such variations and modifications are intended to come within the scope of the appended claims.

I claim:

1. A computer-readable memory for storing a database and indexes used to locate data within the database, comprising:

a non-volatile data storage device;

a database comprising a plurality of records stored on said data storage device in a computer-readable format, each of said records having a number of data fields with at least some of said data fields having a data value stored therein, wherein said records are logically separated into groups of records;

a plurality of indexes, each of which is associated with one of said data fields and each of which comprises a number of keys, whereby at least some of said data fields are indexed;

each of said data values that are stored within an indexed data field having one or more of said keys associated therewith, wherein at least some of said keys are each associated with one or more of said groups and with one or more bits, and wherein each said bit identifies whether or not all of the records within a group associated with that bit contain the data value associated with the key for that group.

2. A computer-readable memory as defined in claim 1, wherein at least one of said keys is associated with a plurality of said groups and with a bit vector containing a first set of bits, wherein each of said bits within said first set is associated with one of said groups within said plurality of groups and identifies whether or not all of the records within the group associated with that bit contain the data value associated with the key for that plurality of groups.

3. A computer-readable memory as defined in claim 2, wherein said bit vectors each include a second set of bits, wherein each of said bits of said second set is associated with one of said groups within said plurality of groups and identifies whether or not any of the records within the group associated with that bit contain the data value associated with the key for that plurality of groups.

4. A computer-readable memory as defined in claim 1, wherein at least one of said keys is associated with a set of said groups of records and with data identifying a single group of records that include at least one record containing the data value associated with that one key.

5. A computer-readable memory as defined in claim 4, wherein the data identifying the single group of records includes a bit indicating whether or not all of the records within that one group contain the data value associated with that key.

6. A computer-readable memory for storing a database and indexes used to locate data within the database, comprising:

a non-volatile data storage device;

a database comprising a plurality of records stored on said data storage device in a computer-readable format, each of said records having a number of data fields with at least some of said data fields having a data value stored therein, wherein said records are logically separated into groups of records;

a plurality of indexes, each of which is associated with one of said data fields and each of which includes a number of fine keys, whereby at least some of said data fields are indexed;

each of said fine keys being associated with one of said data values and with one of said groups of records, wherein no two fine keys within an index are associated with both the same data value and group of records;

wherein said fine keys include a first portion identifying its associated group of records and a second portion identifying its associated data value, said first and second portions being concatenated together with said first portion comprising higher order bits and said second portion comprising lower order bits, whereby said higher and lower order bits together provide a key value that is unique to each fine key within an index and that can be used along with the key values of other fine keys to order said fine keys.

7. A computer-readable memory as defined in claim 6, wherein each of said indexes includes one or more coarse keys associated with said one data field, wherein said one or more coarse keys are each associated with one of said data values and with a set of said fine keys, wherein no two coarse keys within an index are associated with both the same data value and set of said fine keys.

8. A computer-readable memory as defined in claim 7, wherein said coarse keys and said fine keys include key type data having a first numerical value for said fine keys and a different numerical value for said coarse keys.

9. A computer-readable memory as defined in claim 8, wherein said key type data of each key comprises a most significant bit concatenated together with said higher order bits and said lower order bits, said higher order bits of each of said fine keys comprising a number indicative of the group of records associated with that fine key, and said higher order bits of said coarse key comprising a number indicative of the set of fine keys associated with that coarse key, whereby each of said keys in said index has a unique key value that comprises said concatenated bits.

10. A computer-readable memory as defined in claim 9, wherein said fine and coarse keys are stored together in a B-tree in order according to their unique key values.

11. A computer-readable memory as defined in claim 10, wherein said B-tree includes a root node, a plurality of intermediate nodes, and a plurality of leaves and wherein some of said keys are stored at said leaves and others of said keys are stored at said root and intermediate nodes.

12. A computer-readable memory as defined in claim 1, wherein said keys comprise one or more coarse keys and one or more fine keys, with each of said fine keys being associated with one of said groups of records and each coarse key being associated with one or more of said fine keys.

13. A computer-readable memory as defined in claim 1, further comprising a link associated with each of said keys, the link for each key identifying either a single record that contains the data value associated with that key or one or more groups of records which have at least one record that contains the data value associated with that key.

14. A computer-readable memory for storing a database and indexes used to locate data within the database, comprising:

a non-volatile data storage device;

a database comprising a plurality of records stored on said data storage device in a computer-readable format, each of said records having a record number and a plurality of data fields with at least some of said data fields having a data value stored therein, wherein said records are logically separated into groups of records having consecutive record numbers and wherein at least some of said records are physically stored together in order by record number;

a plurality of indexes, each of which is associated with one of said data fields and each of which includes a number of keys, whereby at least some of said data fields are indexed;

each of said keys within an index being associated with one of said data values and with one of said groups of records, whereby each key within the index relates to a group of consecutive record numbers;

wherein said keys include a first portion identifying its associated group of consecutive record numbers and a second portion identifying its associated data value, with said keys of each index being stored in order according to the ordering of the record numbers associated with those keys.

15. A computer-readable memory as defined in claim 14, wherein, within each index, the keys are ordered according to the first portion of each key.

16. A computer-readable memory as defined in claim 14, wherein said indexes are stored on said data storage device in a computer-readable format.

17. A computer-readable memory as defined in claim 14, further comprising a database program stored on said data storage device in a computer-readable format, said database program being operable to perform searches of said database using said indexes and being operable to search the keys of an index in order according to the order in which those keys are stored within the index.

18. A computer-readable memory as defined in claim 17, wherein said database program is operable during searching of said database to identify records satisfying a given search criteria and build a list of the identified records, with said list being built in record number order without utilizing a routine to sort the identified records in said record number order.

19. A computer-readable memory as defined in claim 17, wherein said database program is operable during searching of said database to access records satisfying a given search criteria in record number order.

20. A computer-readable memory as defined in claim 17, wherein said database program and said indexes are stored on a single data storage device.

21. A computer-readable memory as defined in claim 14, wherein said keys comprise fine keys and wherein each index further includes one or more coarse keys, each of which are associated with one of said data values and with a set of said fine keys, wherein each of said coarse keys include a first portion identifying its associated set of fine keys and a second portion identifying its associated data value, and wherein said coarse keys are stored together as a group in order according to their first portion and said fine keys are stored together as a group in order according to their first portion.

22. A method of producing an index used to locate data within a database, comprising the steps of:

(a) generating a number of fine keys using the following steps (a1) through (a3) for each fine key:

(a1) providing a first fine key portion identifying a group of records contained within the database;

(a2) providing a second fine key portion identifying a data value located within a data field of at least one of the records contained within the group of records; and (a3) concatenating the first and second fine key portions together;

(b) generating a number of coarse keys using the following steps (b1) through (b3) for each coarse key:

(b1) providing a first coarse key portion identifying a set of one or more fine keys;

(b2) providing a second coarse key portion identifying a data value located within a data field of at least one of the records contained within one or more of the groups of records associated with the fine keys within the set; and (b3) concatenating the first and second coarse key portions together;

(c) storing the fine keys together as a group on a non-volatile data storage device in order of the first fine key portion; and (d) storing the coarse keys together as a group on a non-volatile data storage device in order of the first coarse key portion.

* * * * *